(12) United States Patent
Kang et al.

(10) Patent No.: US 8,530,325 B2
(45) Date of Patent: Sep. 10, 2013

(54) METHOD OF FORMING ALIGNMENT LAYER AND FABRICATION METHOD OF LIQUID CRYSTAL DISPLAY USING THE SAME

(75) Inventors: Suk Hoon Kang, Seoul (KR); Kyoungtae Kim, Osan-si (KR); Junwoo Lee, Seongnam-si (KR); Baekkyun Jeon, Yongin (KR); Jooseok Yeom, Seoul (KR); Soo-Ryun Cho, Gunpo-si (KR)

(73) Assignee: Samsung Display Co., Ltd., Yongin (KR)

( * ) Notice: Subject to any disclaimer, the term of this patent is extended or adjusted under 35 U.S.C. 154(b) by 80 days.

(21) Appl. No.: 13/243,829

(22) Filed: Sep. 23, 2011

(65) Prior Publication Data

US 2012/0301983 A1   Nov. 29, 2012

(30) Foreign Application Priority Data

May 26, 2011   (KR) ........................ 10-2011-0050314

(51) Int. Cl.
*H01L 21/76* (2006.01)
*H01L 21/36* (2006.01)

(52) U.S. Cl.
USPC .......................................... 438/401; 438/478

(58) Field of Classification Search
USPC .................................................. 438/401, 478
See application file for complete search history.

(56) References Cited

U.S. PATENT DOCUMENTS

2006/0280880 A1* 12/2006 Park ................................ 428/1.1
2009/0237603 A1*  9/2009 Takeshita et al. ............. 349/123
2009/0290109 A1* 11/2009 Lee et al. ....................... 349/123

FOREIGN PATENT DOCUMENTS

KR    10-2010-0060365    6/2010

* cited by examiner

*Primary Examiner* — Luan C Thai
(74) *Attorney, Agent, or Firm* — H.C. Park & Associates, PLC

(57) ABSTRACT

An alignment layer is formed by forming an alignment solution on a base substrate, baking the alignment solution to form an alignment layer, and irradiating light having a wavelength of about 280 nanometers to about 340 nanometers to the alignment layer, thereby aligning the alignment layer. A liquid crystal display is manufactured using the method of forming the alignment layer.

15 Claims, 12 Drawing Sheets

METHOD OF FORMING ALIGNMENT LAYER AND FABRICATION METHOD OF LIQUID CRYSTAL DISPLAY USING THE SAME

CROSS REFERENCE TO RELATED APPLICATION

This application claims priority from and the benefit of Korean Patent Application No. 10-2011-0050314, filed on May 26, 2011, which is hereby incorporated by reference for all purposes as if fully set forth herein.

BACKGROUND

1. Field of Disclosure

Exemplary embodiments of the present invention relate to a method of forming an alignment layer and a fabrication method of a liquid crystal display using the same.

2. Discussion of the Background

In general, liquid crystal displays are classified into twisted nematic type, in-plane switching mode type, or vertical alignment mode type liquid crystal displays according to characteristics of a liquid crystal layer thereof.

When an electric field is not applied, major axes of liquid crystal molecules in the vertical alignment mode liquid crystal display are arranged perpendicular to a surface of a substrate. Thus, the vertical alignment mode liquid crystal display may have a wide viewing angle and a large contrast ratio.

In fabrication of the vertical alignment mode liquid crystal display, the liquid crystal molecules should be initially aligned in a predetermined direction. A rubbing method or a photo-alignment method may be used as the method for the initial alignment of the liquid crystal molecules.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a method of forming an alignment layer using a photo-alignment method.

Exemplary embodiments of the present invention also provide a display apparatus having improved display quality manufactured using the method of forming the alignment layer.

Additional features of the invention will be set forth in the description which follows, and in part will be apparent from the description, or may be learned by practice of the invention.

An exemplary embodiment of the present invention discloses a method of forming an alignment layer including forming an alignment solution on a base substrate, baking the alignment solution to form an alignment layer, and irradiating light having a wavelength of about 280 nanometers to about 340 nanometers to the alignment layer, thereby aligning the alignment layer. The alignment layer includes a photo reactive group. The photo reactive group may be a crosslinking reactive group which causes a photo dimerization or a photo isomerization with a reactive group adjacent thereto when the light is irradiated.

An exemplary embodiment of the present invention also discloses a method of fabricating a liquid crystal display including forming a first alignment layer on a first substrate, forming a second alignment layer on a second substrate, and forming a liquid crystal layer between the first alignment layer and the second alignment layer.

At least one of forming the first alignment layer and forming the second alignment layer includes forming an alignment layer on a corresponding substrate, and irradiating light having a wavelength of about 280 nanometers to about 340 nanometers to the alignment layer, thereby aligning the alignment layer.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
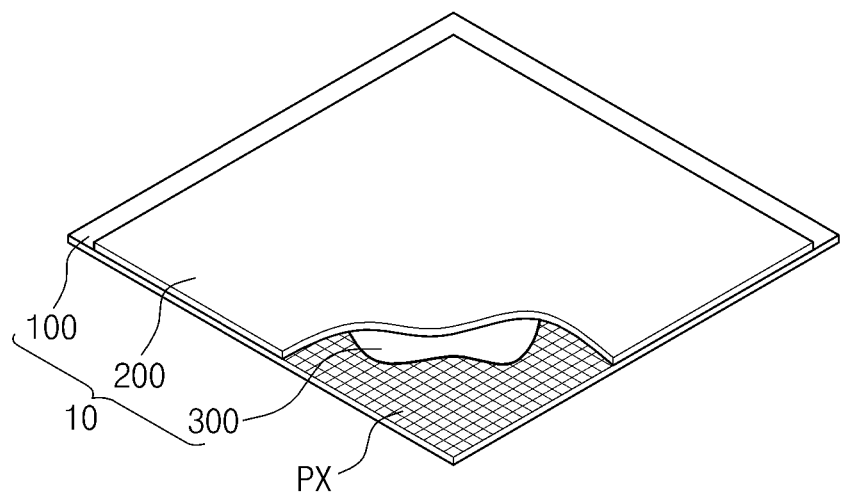
FIG. 1 is an exploded perspective view showing a liquid crystal display according to an exemplary embodiment of the present invention.

Hereinafter, the present invention will be explained in detail with reference to the accompanying drawings, in which embodiments of the invention are shown. This invention may, however, be embodied in many different forms and should not be construed as limited to the embodiments set forth herein.

Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
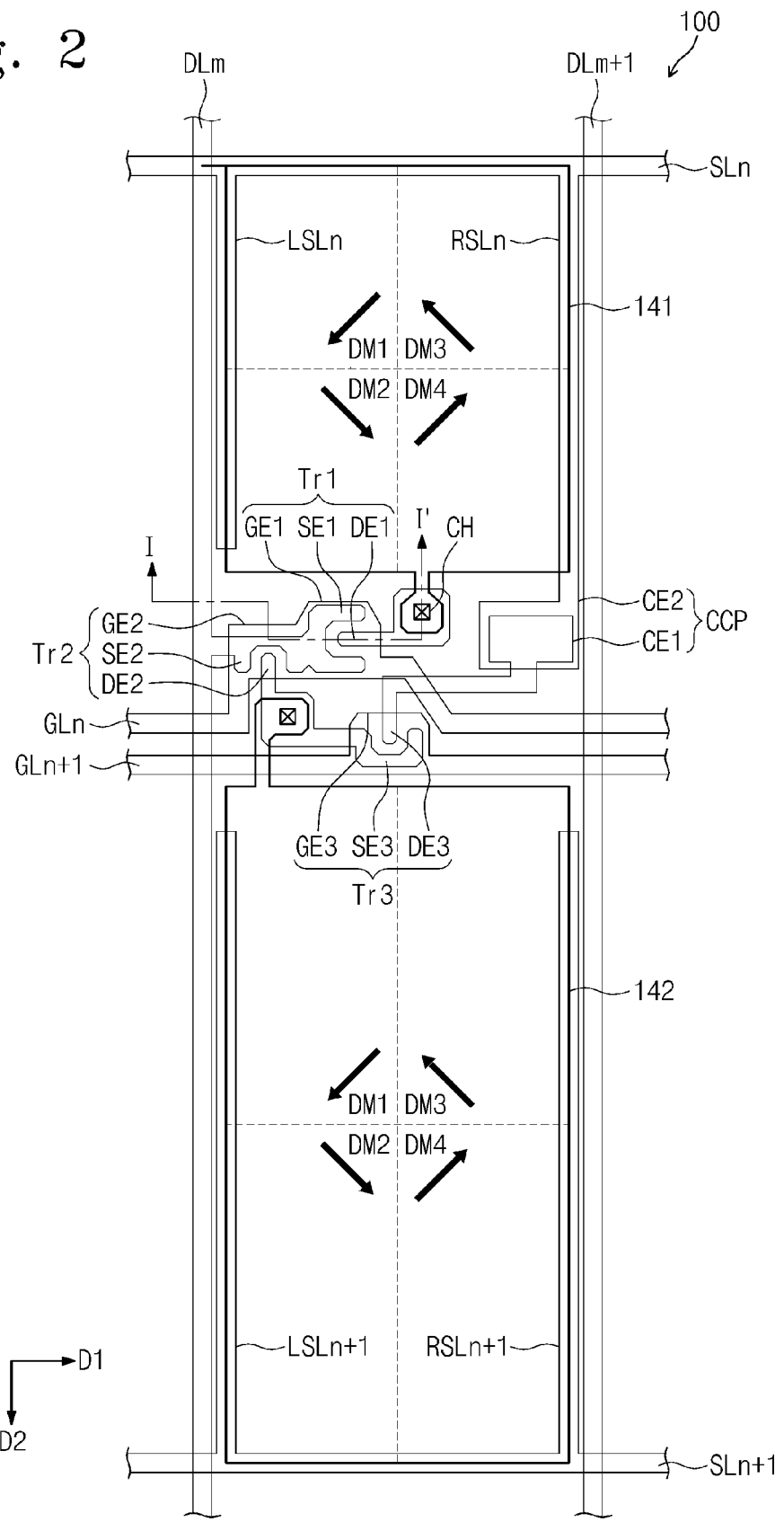
FIG. 2 is a view showing the layout of a pixel illustrated in FIG. 1.
Figure 3:
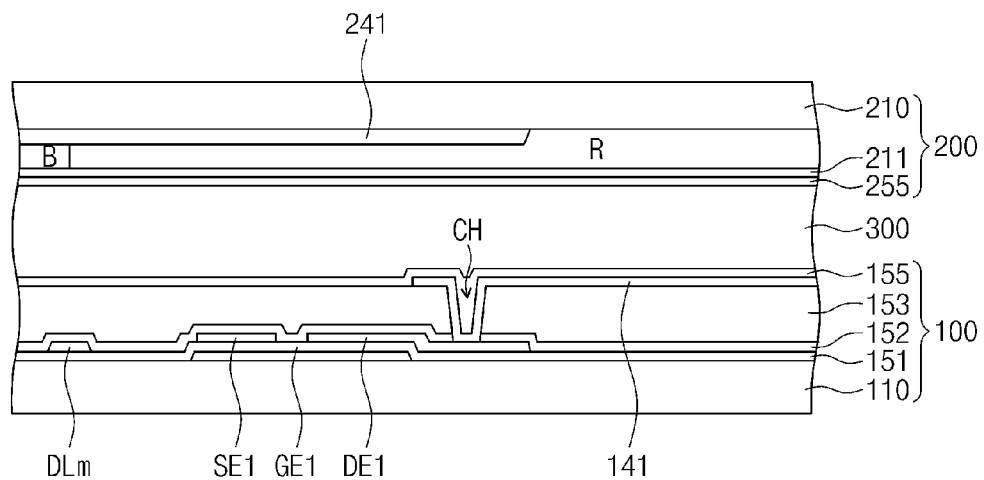
FIG. 3 is a cross sectional view taken along line I-I' of FIG. 2.

FIG. 1 is an exploded perspective view showing a liquid crystal display according to an exemplary embodiment of the present invention. FIG. 2 is a view showing the layout of a pixel illustrated in FIG. 1, and FIG. 3 is a cross sectional view taken along line I-I' of FIG. 2. The layout of a pixel of FIGS. 2 and 3 will be described as an exemplary embodiment, however, the pixel layout should not be limited thereto. The pixel according to another exemplary embodiment of the present invention may have a different layout from the layout illustrated in FIGS. 2 and 3. For example, in another exemplary embodiment, a single gate line and a single data line may be connected to a single pixel. In still another exemplary embodiment, a single gate line and two data lines may be connected to a single pixel.

Referring to FIG. 1, a liquid crystal display 10 according to this exemplary embodiment of the present invention includes a first substrate 100 including a plurality of pixels PX, a second substrate 200, and a liquid crystal layer 300 interposed between the first substrate 100 and the second substrate 200.

Referring to FIGS. 1 to 3, the first substrate 100 includes a first base substrate 110, a plurality of gate lines and a plurality of data lines provided on the first base substrate, a plurality of the pixels connected to the gate lines and data lines, and a first alignment layer formed on the pixels.

For the purpose of convenience in explanation, FIGS. 2 and 3 show a single pixel with a nth gate line GLn, a (n+1)th gate line GLn+1, a mth data line DLm, and a (m+1)th data line DLm+1. However, in the liquid crystal display in the present embodiment, other pixels have a structure the same as or similar to the pixel in FIGS. 2 and 3. Hereinafter, the nth gate line GLn and the (n+1)th gate line GLn+1 are referred to as a first gate line and a second gate line, respectively, and the mth data line DLm and the (m+1)th data line DLm+1 are referred as to a first data line and a second data line, respectively.

The first and second gate lines GLn and GLn+1 are disposed on the first base substrate 110 to be extended parallel to each other in a first direction D1. The first and second data lines DLm and DLm+1 are extended parallel to each other in a second direction D2 crossing the first direction D1.

Each of the pixels PX includes a first sub pixel and a second sub pixel. The first sub pixel comprises a first thin film transistor Tr1, a first pixel electrode 141, and a first storage electrode. The second sub pixel comprises a second thin film transistor Tr2, a second storage electrode, a third thin film transistor Tr3, a second pixel electrode 142, and a coupling capacitor electrode CE1. The first and second sub pixels are disposed between the first data line DLm and the second data line DLm+1 adjacent to each other.

The first thin film transistor Tr1 of the first sub pixel is connected to the first data line DLm and the first gate line GLn.

The first thin film transistor Tr1 has a first gate electrode GE1 which is extended from the first gate line GLn, a first source electrode SE1 which is extended from the first data line DLm, and a first drain electrode DE1 which is electrically connected to the first pixel electrode 141.

The first storage electrode includes a first storage line SLn extended in the first direction D1, and first and second branch electrodes LSLn and RSLn extended from the first storage line SLn in the second direction D2.

The first pixel electrode 141 partially overlaps with the first storage line SLn and the first and second branch electrodes LSLn and RSLn to form a first storage capacitor.

The second thin film transistor Tr2 comprises a second gate electrode GE2 which is extended from the first gate line GLn, a second source electrode SE2 extended from the first data line DLm, and a second drain electrode DE2 which is electrically connected to the second pixel electrode 142.

The second storage electrode includes a second storage line SLn+1 extended in the first direction D1, and third and fourth branch electrodes LSLn+1 and RSLn+1 extended from the second storage line SLn+1 in the second direction D2.

The second pixel electrode 142 partially overlaps with the second storage line SLn+1 and the third and fourth branch electrodes LSLn+1 and RSLn+2 to form a second storage capacitor.

The third thin film transistor Tr3 comprises a third gate electrode GE3 which is extended from the second gate line GLn+1, a third source electrode SE3 is extended from the second drain electrode DE2, and a third drain electrode DE3 which is connected to the coupling capacitor electrode CE1. The coupling capacitor electrode CE1 overlaps with an opposite electrode CE2 being extended from the second branch electrode RSLn to form a coupling capacitor CCP.

Referring to FIG. 3, the first substrate 100 further includes a gate insulating layer 151, a first protection layer 152, and a second protection layer 153. In the present exemplary embodiment, the first substrate 100 includes the double layered protection layer of the first and second protection layers 152 and 153, but the first substrate 100 should not be limited thereto. In another exemplary embodiment, the first substrate 100 may include a single layered protection layer. In still another exemplary embodiment, the first substrate 100 may include a single, or a triple or more layered protection layer.

The first alignment layer 155 is disposed on the first base substrate 110 on which the first pixel electrode 141 and the second pixel electrode 142 are formed. The first alignment layer 155 includes a plurality of regions which are photo-aligned to have alignment directions different from each other. In an exemplary embodiment of the present invention, the plurality of regions consisting of a first domain DM1, a second domain DM2, a third domain DM3, and a fourth domain DM4 are described. The first alignment layer 155 may align liquid crystal molecules of the liquid crystal layer 300 in different directions according to the first to fourth domains DM1, DM2, DM3 and DM4. The first alignment layer 155 will be described later.

Meanwhile, the second substrate 200 includes a second base substrate 210, a black matrix 241, color filters R, G (not shown), and B, a common electrode 211 and a second alignment layer 255.

The color filters R, G, and B and the black matrix 241 are provided on the second base substrate 210. The common electrode 211 and the second alignment layer 255 may be sequentially stacked on the color filters R, G, and B and the black matrix 241.

The color filters R, G, and B are provided corresponding to the pixels PX. The color filters R, G, and B each realize one color of a red color R, a green color G and a blue color B, respectively. The black matrix 241 is formed between the color filters R, G, and B to block light passing through the liquid crystal layer 300 between the color filters R, G, and B. The common electrode 211 is provided on the color filters R, G, and B and the black matrix 241.

The second alignment layer 255 is provided on the second base substrate 210 on which the common electrode 211 is formed. The second alignment layer 255 includes a plurality of regions which are photo-aligned to have alignment directions different from each other corresponding to the alignment directions of the first alignment layer 155.

The first alignment layer 155 and the second alignment 255 may have a plurality of domains which are formed by using photo-alignment and have the alignment directions different from each other. The alignment direction of a final liquid crystal display may be a vector sum of the alignment direction of the domain of the first alignment layer 155 and the alignment direction of the domain of the second alignment layer 255 corresponding to the domain of the first alignment layer 155. Also, the plurality of domains may correspond to each of the pixels PX. For example, when the first alignment layer 155 includes the first to fourth domains DM1, DM2, DM3, and DM4 having the alignment directions different from each other, the first to fourth domains DM1, DM2, DM3, and DM4 may correspond to each of the first sub pixel and the second sub pixel.

The liquid crystal layer 300 is interposed between the first alignment layer 155 and the second alignment layer 255. The liquid crystal layer 300 is a vertical alignment liquid crystal mode, but it should not be limited thereto. In another exemplary embodiment, the liquid crystal layer 330 may be a twisted nematic liquid crystal mode.

Hereinafter, the first alignment layer 155 and the second alignment layer 255 will be described in more detail. The liquid crystal molecules in the liquid crystal layer 300 have a pretilt angle which changes according to characteristics of the first alignment layer 155 and the second alignment layer 255

Each of the first alignment layer 155 and the second alignment layer 255 includes a main alignment material and a vertical photo-alignment material which is mixed into the main alignment material, and has the vertical photo-alignment material containing a vertical functional group on a side chain thereof. The main alignment material and the vertical photo-alignment material are in micro phase separation state (MPS).

The vertical photo-alignment material is mostly disposed in a surface region of each of the first and second alignment layer 155 and 255 adjacent to the liquid crystal layer 300. The main alignment material is mostly disposed in a portion of each of the first and second alignment layers 155 and 255 adjacent to each of the first and second base substrates 110 and 210, respectively. Thus, a ratio of the molar concentration of the vertical photo-alignment material in the first alignment layer 155 with respect to that of the main alignment material increases toward the surface of the first alignment layer 155 adjacent to the liquid crystal layer 300. The vertical functional group in the vertical photo-alignment material may be present from the surface of the first alignment layer 155 adjacent to the liquid crystal layer 300 to a depth corresponding to about 20% of a thickness of the entire first alignment layer 155.

The vertical photo-alignment material has a molecular weight of about 1,000 to about 1,000,000 on average. The vertical photo-alignment material comprises a main chain and a side chain connected to the main chain. The main chain may include at least one of polyimide, polyamic acid, polyamide, polyamicimide, polyester, polyethylene, polyurethane, polystyrene or polysiloxane. The strength of the main chain increases as the amount of ring structures (e.g. imide group) in the main chain increases. Thus, a stain caused by driving the liquid crystal display for a long time decreases, and the stability of the alignment layer to the pretilt improves. When the main chain includes the imide group with a molar concentration of about 50 mol % or more, the stain decreases more and the stability further improves. In this case, an angle of the pretilt has a range of about 85 degrees to about 89.9 degrees.

The side chain includes at least one of a flexible functional group, a thermoplastic functional group, a photo reactive group, or a vertical functional group.

The flexible functional group and/or the thermoplastic functional group are functional groups which assist the side chain to be easily aligned. The flexible functional group and/or the thermoplastic functional group may include a substituted or non-substituted alkyl group and/or alkoxy group which have carbon numbers of about 3 to about 20.

The photo reactive group is a functional group which gives rise to a photo dimerization or a photo isomerization. For example, the photo reactive group may include at least one of an azo compound, a cinnamate compound, a chalcone compound, a coumarin compound and a maleimide compound.

The vertical functional group is a functional group which supports the entire side chain in a direction perpendicular to the main chain which is parallel to the base substrates 110 and 210. The vertical functional group may include an aryl group which is substituted with an alkyl group and/or an alkoxy group having carbon numbers of about 3 to about 10, or a cyclohexyl group which is substituted with the alkyl group and/or the alkoxy group having carbon numbers of about 3 to about 10.

The vertical photo-alignment material may be formed through a polymerization of an acid anhydride and a monomer such as a diamine with the flexible functional group, the photo reactive group, and/or the vertical functional group used as the side chain. Alternatively, the vertical photo-alignment material may be formed through adding a compound with the thermoplastic functional group, the photo reactive group, and/or the vertical functional group to polyimide and/or polyamic acid. In this case, the thermoplastic functional group may be directly bonded to the main chain.

The main alignment material may include the main chain, and have a weight-average molecular weight of about 1,000 to about 1,000,000. When the main alignment material includes the imide group with a molar concentration of about 50 mol % to about 80 mol %, a stain and/or an image sticking of the liquid crystal display further decreases. The main alignment material may include the vertical functional group with a molar concentration of about 5 mol % or less, which is used as a side chain combined to the high molecular weight main chain. Since the main alignment material includes the vertical functional group with a molar concentration of about 5 mol % or less, the micro phase separation of the main alignment material is formed to be increasingly clear, and the image sticking of the liquid crystal display decreases. Furthermore, when the vertical functional group in the main alignment material has a molar concentration of about 2 mol % or less, the image sticking of the liquid crystal display further decreases.

A mixing weight ratio of the vertical photo-alignment material to the main alignment material may be in a range of about 5:95 to about 50:50. When the vertical photo-alignment material is present at a concentration of about 50 weight-percent or less, a voltage holding ratio increases to reduce the image sticking of the liquid crystal display. When the vertical photo-alignment material is present at a concentration of about 5 weight-percent or more, uniformity of the pretilt is maintained to reduce the stain of the liquid crystal display. When the vertical photo-alignment material is present in the mixing weight ratio with the main alignment material at about 10 weight-percent to about 30 weight-percent, the image sticking and the stain of the liquid crystal display further decrease. Since the amount of the photo reactive group is reduced as the ratio of the vertical photo-alignment material is reduced, the generation of a needless byproduct decreases, so that the image sticking of the liquid crystal display is reduced and a reaction efficiency increases. Also, a process cost is reduced as the ratio of the vertical photo-alignment material is reduced.

Each of the vertical photo-alignment material and the main alignment material has a surface tension in a range of about 25 dyne/cm to about 65 dyne/cm. The surface tension of the vertical photo-alignment material may be equal to or less than that of the main alignment material. In this case, the micro phase separation structure is formed to be further clear.

A method of fabricating a liquid crystal display according to an embodiment of the present invention will be described in more detail. The same elements as described illustrated in FIGS. 1 to 3 will be indicated by the same reference numerals or the same reference designators. For the purpose of ease and convenience in explanation, the descriptions to the same elements as illustrated in FIGS. 1 to 3 will be omitted or mentioned briefly.

A method of fabricating a liquid crystal display according to an exemplary embodiment of the present invention includes preparing the first substrate 100 and the second substrate 200, and forming the liquid crystal layer 300 between the first substrate 100 and the second substrate 200.

A plurality of gate lines GLn and GLn+1, a plurality of data lines DLm and DLm+1 and a plurality of pixels PX connected to the gate lines GLn and GLn+1 and the data lines DLm and DLm+1 are formed on the first base substrate 110, and then the first alignment layer 155 is formed on the pixels PX. Thus, the first substrate 100 is manufactured.

The gate lines GLn and GLn+1, the data lines DLm and DLm+1, and the first to third thin film transistors Tr1, Tr2, and Tr3 are formed on the first base substrate 110. The first protection layer 152 and the second protection 153 are formed on the first to third thin film transistors Tr1, Tr2, and Tr3. The pixel electrodes 141 and 142 are formed to be connected to the thin film transistors Tr1, Tr2, and Tr3 through contact holes CH while interposing the first and second protection layer 152 and 153 therebetween. The thin film transistors include the first to third thin film transistors Tr1, Tr2, and Tr3, and the pixel electrodes includes the first pixel electrode 141 connected to the first thin film transistor Tr1, and the second pixel electrode 142 connected to the second thin film transistor Tr2.

The first alignment layer 155 is formed on the first base substrate 110 on which the first and second pixel electrodes 141 and 142 are formed. A first alignment solution is formed on the first base substrate 110 and then the first alignment solution on the first base substrate 110 is baked, thereby forming the first alignment layer 155.

The first alignment solution may be a mixture of the vertical photo-alignment material and the main alignment material. The first alignment solution may be printed on the first base substrate 110 by an inkjet method. The bake of the first alignment solution may be performed by two steps. A pre-bake process may be performed to the first alignment solution at a temperature within the range of about 70 degrees Celsius to about 80 degrees Celsius for a time within the range of about 2 minutes to about 3 minutes, so that a solvent in the first alignment solution is removed. Next, a bake process may be performed at a temperature of about 210 degrees Celsius or more for a time within the range of about 10 minutes to about 20 minutes, thereby forming the first alignment layer 155. The first alignment layer 155 is formed to have the micro phase separation structure through the bake process, resulting in forming the vertical photo-alignment material in an upper portion of the first alignment layer 155 and the main alignment material in a lower portion of the first alignment layer 155.

An exposure process is performed in which light of a predetermined wavelength is irradiated to the first alignment layer 155 in a direction perpendicular to or tilted with respect to the first base substrate 110 so as to make the first alignment layer 155 have directionality. Light having a wavelength in a range of about 280 nanometers to about 340 nanometers may be irradiated to the first alignment layer 155 with the exposure amount (energy) of about 3 mJ (milli-joule) to about 50 mJ through the exposure process. According to another embodiment, the light may be irradiated to the first alignment layer 155 with an exposure amount of about 10 mJ to about 50 mJ.

In order to form a pretilt angle of the first alignment layer 155 for the vertical alignment mode, the light may be irradiated to the first alignment layer 155 in an irradiation angle of about 40 degrees to about 50 degrees from normal, where normal is perpendicular to the surface of the first substrate 110. The exposure intensity of the irradiated light may have a range of about 10 mW/cm$^2$ to about 50 mW/cm$^2$. The light may be irradiated to a surface of the first alignment layer 155, or the light may be irradiated by a scan method.

The light may be provided using a lamp having a peak in the wavelength band of about 280 nanometers to about 340 nanometers. The light may be provided using a lamp having a wavelength band wider than the wavelength band of about 280 nanometers to about 340 nanometers. In this case, a low pass filter and a high pass filter may be used. The low pass filter blocks light of a wavelength shorter than 280 nanometers (hereinafter, referred to as 'short-wavelength light'), and the high pass filter blocks light of a wavelength longer than 340 nanometers (hereinafter, referred to as 'long-wavelength light').

The wavelength band of about 280 nanometers to about 340 nanometers is an ultraviolet wavelength band, and the light may be a partially polarized ultraviolet or a linearly polarized ultraviolet light. The polarized ultraviolet light may be light of which an extinction ratio (i.e. a ratio of a P polarization to an S polarization) has a range of about 3:1 to about 200:1. The polarized ultraviolet light may be manufactured using a plurality of quartz substrates.

In the exposure process, since the photo-alignment materials of the first and second alignment layers 155 and 255 sensitively react to light of a specific wavelength (in particular, the ultraviolet), a condition of the exposure process is limited to a specific range, thereby preventing or removing a side reaction.

The wavelength range, the exposure amount, the irradiated angle, and the exposure intensity are used as factors influencing the reaction of the first and second alignment layers 155 and 255.

In the wavelength range, if ultraviolet light of the entire ultraviolet wavelength range is irradiated to the photo-alignment material, deterioration of the image sticking and/or characteristic occurs by the sub reactions of the alignment layer. Thus, the wavelength range is limited to a specific range. The image sticking easily occurs when ultraviolet light of a short-wavelength is used. The image sticking decreases as the wavelength of the ultraviolet light becomes longer. On the contrary, an alignment angle and the stability of the pretilt are influenced by ultraviolet light of a long-wavelength.

In the exposure amount, although an optimal wavelength is selected for formation of the pretilt of the liquid crystal molecules and then the ultraviolet of the optimal wavelength is irradiated to the photo-alignment material, the side reaction being unnecessary partially occurs in the selected wavelength. Thus, if the exposure amount is too much, the image sticking of the liquid crystal display increases. If the exposure amount is not enough, the pretilt is not formed. Also, if the exposure amount of the ultraviolet increases greater than a specific range, the image sticking gets worse, so that the pretilt does not return to an original state and a transmittance is reduced. On the other hand, if the exposure amount of the ultraviolet decreases less than the specific range, the pretilt is lowered and the transmittance is reduced. Thus, a beating texture fault occurs.

Regarding the irradiated angle, when linearly polarized light with the same energy irradiated, the formation of the pretilt increases as the irradiated angle with respect to a surface perpendicular (normal) to the first and second base substrates 110 and 210 increases. As the irradiated angle increases, the pretilt angle is increased and the exposure amount is reduced. However, since an irradiated region decreases as the irradiated angle becomes greater, a power or size of a lamp apparatus emitting the light may need to increase. Also, an alignment process time increases and a uniformity of the alignment decreases.

If the exposure intensity of light varies under the same energy, significant differences of characteristics of the pretilt, the voltage holding ratio (VHR), an ion density (ID), and the image sticking may not be great. However, when the exposure intensity is lowered below about 10 mW/cm$^2$, the electrical characteristic (e.g. the VHR) is substantially the same as the electrical characteristic according to the exposure intensity higher than about 10 mW/cm$^2$, but the formation of the pretilt may be less. Also, if the exposure intensity increases, the entire alignment time becomes less, but a lifetime of the lamp providing the light and a photo-system may also decrease.

The method described above may be performed using a photo-alignment method, thereby aligning the first alignment layer 155. Thus, since the formation process of the first alignment layer 155 does not require a rubbing process, a production rate may be increased and a process cost may be reduced. Also, an irradiated direction of the ultraviolet light varies using a mask, thereby forming multi-domains having directions of the pretilt different from each other.

The black matrix 241, the color filters R, G, and B, and the common electrode 211 are formed on the second base substrate 210 and then the second alignment layer 255 is formed on the common electrode 211. Thus, the second substrate 200 is manufactured.

A formation method of the second alignment layer 255 is substantially the same as that of the first alignment layer 155. Thus, a further description of the formation method of the second alignment layer 255 is omitted here.

Subsequently, the liquid crystal layer 300 is formed between the first alignment layer 155 and the second alignment layer 255.

EXPERIMENT EXAMPLE

In the method of fabricating the liquid crystal display according to an exemplary embodiment of the present invention, the following experiment was performed for the formation of an alignment layer.

Experiment Example 1

Experiment Wavelength Band

Figure 4:
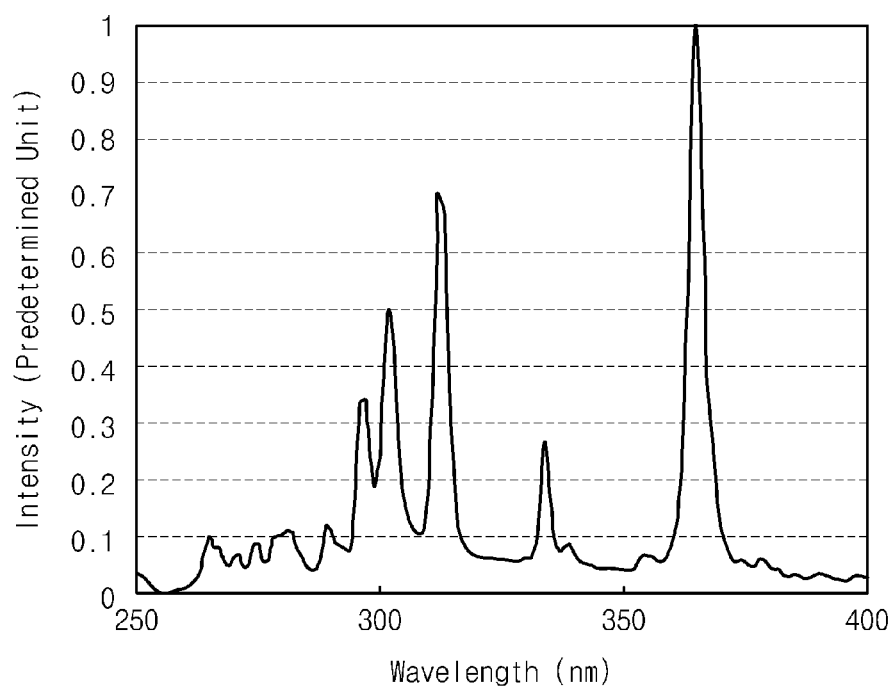
FIG. 4 is a graph showing a spectrum of an exposure apparatus.

For identification of the exposure condition in formation of the alignment layer, an ultraviolet exposure apparatus emitting ultraviolet light having a wavelength of 250 nanometers to 400 nanometers was prepared. FIG. 4 is a graph showing a spectrum of ultraviolet light from the ultraviolet exposure apparatus.

A band pass filter was installed in the ultraviolet exposure apparatus to emit the following wavelength bands.

1a-th wavelength band: 260 nanometers or more
1b-th wavelength band: 280 nanometers or more
2-th wavelength band: 340 nanometers or less
3-th wavelength band: 280 nanometers to 340 nanometers
4-th wavelength band: the entire wavelength range
5a-th wavelength band: 297 nanometers (a single wavelength)
5b-th wavelength band: 302 nanometers (a single wavelength)
5c-th wavelength band: 314 nanometers (a single wavelength)
5d-th wavelength band: 334 nanometers (a single wavelength)
5e-th wavelength band: 365 nanometers (a single wavelength)

Experiment Example 2

Evaluation for Lowest Limit Range of Wavelength of Light Source

1) Evaluation for Image Sticking

The 4-th wavelength band, the 1a-th wavelength band, the 1b-th wavelength band, and the 5a-th wavelength band were selected from the wavelength bands of the ultraviolet exposure apparatus and evaluated for the image sticking of the liquid crystal display. The photo-alignment process using the ultraviolet exposure apparatus was performed on the alignment material described above. The process conditions of the photo-alignment process were carried out with an exposure amount of 50 mJ, an exposure intensity of 40 mW/cm$^2$, and an irradiated angle of 45 degrees. In a surface image sticking evaluation, a level 1 corresponds to the case that the image sticking does not exist, a level 2 corresponds to the case that the image sticking is insubstantially visible, a level 3 corresponds to the case that the image sticking is weakly visible, a level 4 corresponds to the case that the image sticking is moderately visible, and a level 5 corresponds to the case that the image sticking is strongly visible. In a black image sticking evaluation, a level 1 corresponds to the case that the image sticking does not exist, a level 2 corresponds to the case that the image sticking is weakly visible in flank, a level 3 corresponds to the case that the image sticking is visible in flank, a level 4 corresponds to the case that the image sticking is visible in front, and a level 5 corresponds to the case that the image sticking is strongly visible in front.

The results of a linear image sticking to the wavelength bands were 336 hours to the 4-th wavelength band and 432 hours to the 1a-th wavelength band. The image sticking did not occur after more than 1000 hours in the 1b-th wavelength band.

The results of the surface image sticking evaluated for 336 hours were a level 3 at the 4-th wavelength band, a level 2.5 at the 1a-th wavelength band, and a level 2 at the 1b-th wavelength band.

The results of the black image sticking evaluated for 336 hours were a level 3 at the 4-th wavelength band, a level 2.5 at the 1a-th wavelength band, and a level 1.5 at the 1b-th wavelength band.

If the wavelength bands are enumerated from the most generated image sticking, the 4-th wavelength band, the 1a-th wavelength band, the 1b-th wavelength band and the 5a-th wavelength band are sequentially configured (the 4-th wavelength band>the 1a-th wavelength band>>the 1b-th wavelength band, the 5a-th wavelength band). According to the results, when the entire wavelength range of the ultraviolet exposure apparatus was irradiated, the most deterioration phenomenon of the image sticking was confirmed, and a problem of the linear image sticking was improved by more than three times in the 1b-th wavelength band which removes a short wavelength equal to or less than 280 nanometers. The image sticking of the 1b-th wavelength band was the same level as that of the 5a-th wavelength band irradiating the single wavelength of 297 nanometers.

In particular, when the short wavelength range less than 280 nanometers was irradiated to a crosslink type alignment material, the image sticking increased. And when the exposure amount of the ultraviolet light was increased, the image sticking equally occurred. This is because the crosslink type alignment material shows high reactivity in the short wavelength light, particularly, 280 nanometers more or less. Based on evaluation of infrared (IR) spectra and electrical characteristics, the side reaction (photodecomposition) did not occur at the exposure amount of 250 mJ in the ultraviolet wavelength of 280 nanometers or less, but the photodecomposition phenomenon occurred at the exposure amount of 50 mJ when the entire ultraviolet wavelength band was used.

The cause of the deterioration of the image sticking may be due to the side reaction or surface variation occurrence by an optic reaction (including the crosslink, decomposition reaction) during the exposure to ultraviolet light. Since a surface polarity is changed by the side reaction or the surface variation occurrence, a reduction of the VHR and an increase of the ID may occur.

2) Evaluation for VHR and ID

The 1a-th wavelength band, the 1b-th wavelength band, the 3-th wavelength band, the 4-th wavelength band, and the 5a-th to 5e-th wavelength bands were selected from the wavelength bands of the ultraviolet exposure apparatus to perform the evaluation for the VHR and ID of the liquid crystal display. The photo-alignment process using the ultraviolet exposure apparatus was performed on the alignment material. The process conditions of the photo-alignment process were an exposure amount of 50 mJ, an exposure intensity of 40 mW/cm$^2$, and an irradiated angle of 45 degrees.

Figure 5:
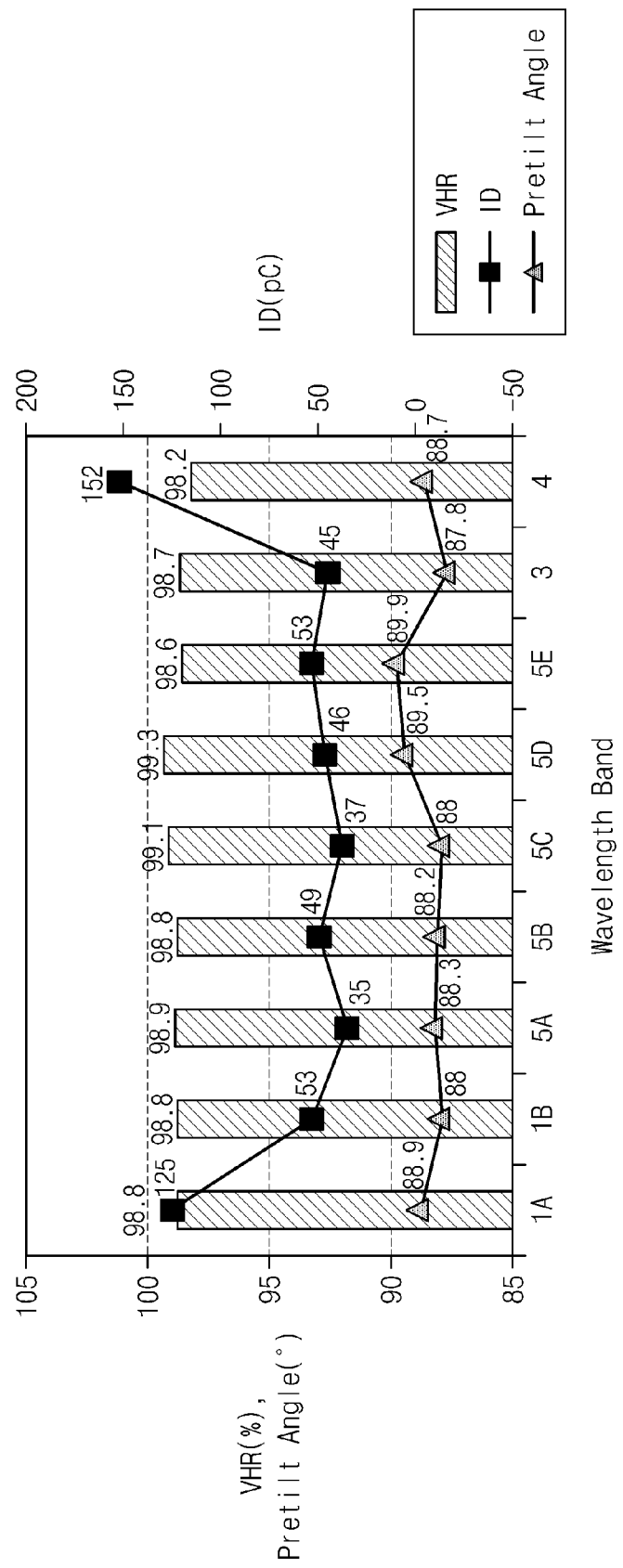
FIG. 5 is a graph showing a voltage holding ratio (VHR), an ion density (ID), and a pretilt angle according to each of wavelength bands.

FIG. 5 is a graph showing a voltage holding ratio (VHR), an ion density (ID), and a pretilt angle according to each of the selected wavelength bands.

Referring to FIG. 5, when light of the 4-th wavelength band or the 1b-th wavelength band was irradiated, the pretilt angle was substantially unaffected. When light of 260 nanometers to 280 nanometers was irradiated, the VHR was reduced by 0.5~0.8%. Also, the ID after the exposure to light of 260 nanometers to 280 nanometers increased as much as 2 to 5 times the ID of that irradiated by light of 280 nanometers or more. Thus, it is confirmed that a detrimental effect on an electrical characteristic results when light of less than 280 nanometers is used.

3) Result of Vcom Shift

The 1a-th wavelength band, the 1b-th wavelength band, the 3-th wavelength band, the 4-th wavelength band, and the 5a-th to 5e-th wavelength bands were selected from the wavelength bands of the ultraviolet exposure apparatus to perform an evaluation of Vcom shift of the liquid crystal display. The photo-alignment process using the ultraviolet exposure apparatus was performed on the alignment material. The process conditions of the photo-alignment process were an exposure amount of 50 mJ, an exposure intensity of 40 mW/cm$^2$, and an irradiated angle of 45 degrees.

Figure 6:
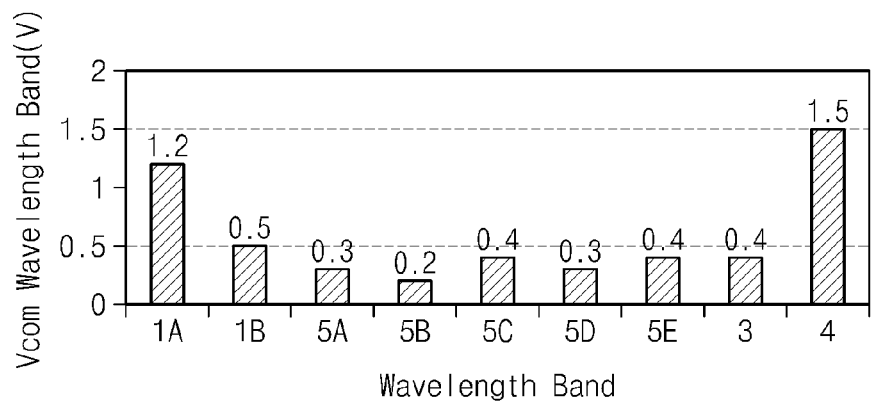
FIG. 6 is a graph showing a common voltage (Vcom) shift value according to each of wavelength bands.

FIG. 6 is a graph showing a common voltage (Vcom) shift value according to each of the selected wavelength bands.

Referring to FIG. 6, the amount of the Vcom shift increased in the 4-th wavelength band. It shows that the amount of the Vcom shift increases when the exposure light includes the short wavelength ultraviolet light. This result means that a direct current image sticking increases. The direct current image sticking is the major cause of the image sticking deterioration. On the contrary, little Vcom shift influence was found in evaluation of the wavelength band of 280 nanometers or more, and in each of the single wavelengths more than 280 nanometers.

It is estimated that the Vcom shift phenomenon is influenced by a direct current of the image sticking.

4) Evaluation for Photo-Rearrangement Influence

The 1b-th wavelength band and the 4-th wavelength band were selected from the wavelength bands of the ultraviolet exposure apparatus. Light of the 1b-th and 4-th wavelength bands was irradiated with the exposure amounts (50 mJ, 250 mJ) different from each other. Transmittance of the liquid crystal display depending on the wavelength band was measured with a Fourier transform infrared (FT-IR) spectroscopy. The photo-alignment process was performed on the alignment material, and the process conditions of the photo-alignment process using the ultraviolet exposure apparatus were exposure amounts of 50 mJ and 250 mJ, an exposure intensity of 40 mW/cm$^2$, and an irradiated angle of 45 degrees. Also, the transmittance for a case being non-irradiated with light of the 1b-th and 4-th wavelength bands was measured.

Figure 7:
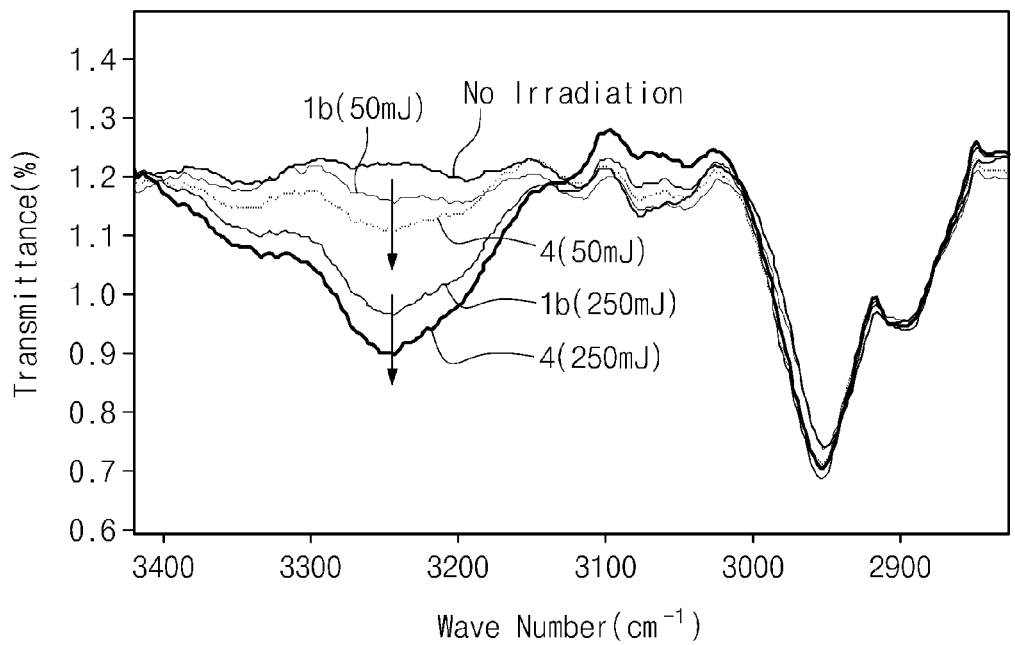
FIG. 7 is a graph showing an IR spectrum depending on a wave number.

FIG. 7 is a graph showing an IR spectrum depending on wave number (inverse wavelength).

Referring to FIG. 7, when the light of the 4-th wavelength band was irradiated, a peak of an —OH group was increased as compared with that of the 1b-th wavelength band. The increase of the peak of —OH may be because of the side reaction generated by a photo-Fries rearrangement.

Referring to FIG. 7, the increase of the peak of —OH was accelerated as the exposure amount increased. The peak of —OH was rapidly increased at the exposure amount of 250 mJ as compared with the exposure amount of 50 mJ. The reaction phenomenon of the photodecomposition of the 4-th wavelength band was increased at the exposure amount of 50 mJ as compared with that of the 1b-th wavelength band. This is confirmed through the analysis of the peak of —OH generated at 3250 cm$^{-1}$.

Experiment Example 3

Evaluation for Upper Limit Range of Wavelength of Ultraviolet Light Source

1) Evaluation for Formation of Pretilt

The 1a-th wavelength band, the 1b-th wavelength band, the 3-th wavelength band, the 4-th wavelength band, and the 5a-th to 5e-th wavelength bands were selected from the wavelength bands of the ultraviolet exposure apparatus to perform the evaluation for the VHR and ID of the liquid crystal display. The photo-alignment process using the ultraviolet exposure apparatus was performed on the alignment material. The process conditions of the photo-alignment process were an exposure amount of 50 mJ, an exposure intensity of 40 mW/cm$^2$, and an irradiated angle of 45 degrees.

Figure 8:
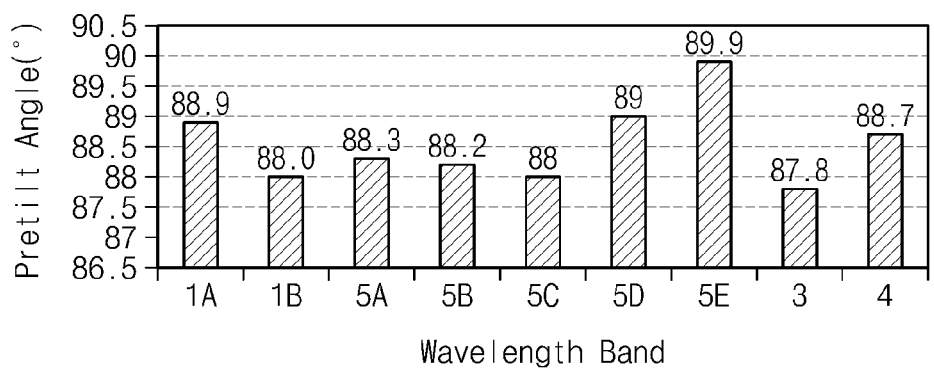
FIG. 8 is a graph showing a pretilt angle according to each of wavelength bands.
Figure 9A:
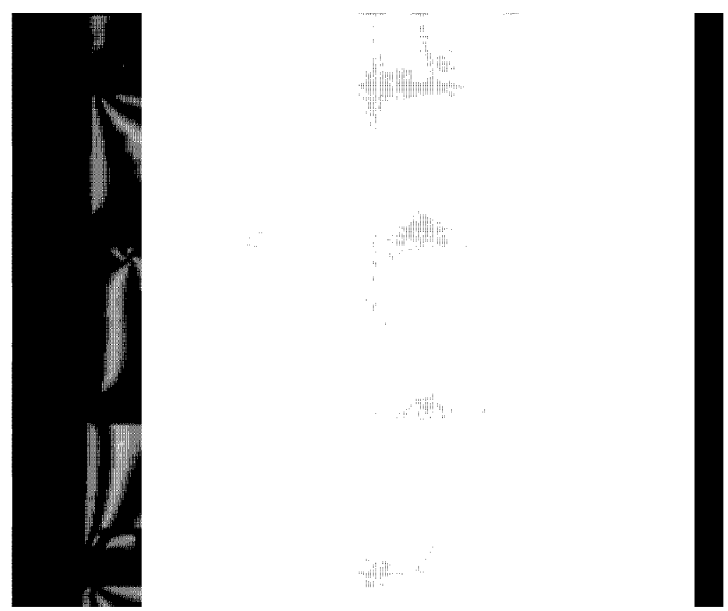
FIG. 9A is a photograph of a pixel irradiated with light of a 5-th wavelength band.

FIG. 8 is a graph showing a pretilt angle according to each of the selected wavelength bands. FIG. 9A is a photograph of a pixel irradiated with light of a 5 th wavelength band, and FIG. 9B is a photograph of a pixel irradiated with light of a 1b th wavelength band.

Figure 9B:
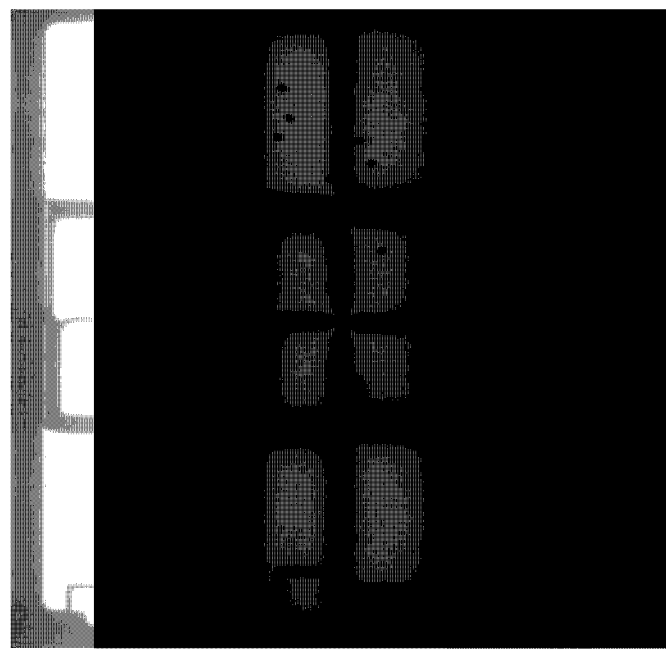
FIG. 9B is a photograph of a pixel irradiated with light of a 1b-th wavelength band.

Referring to FIGS. 8, 9A and 9B, the pretilt angles (e.g., 1 to 2 degrees from normal, or 89 to 88 degrees, respectively, where normal is perpendicular to the facing surfaces of the first substrate 110 and the second substrate 210) were properly formed in the 5a-th to 5d-th wavelength bands of 50 mJ. But, when the light of the 5e-th wavelength band was irradiated, the pretilt angle was 89.9 degrees (that is, the pretilt angle was not formed).

Removal of light of the 365 nanometers band is performed so that an optimized long wavelength capable of forming the pretilt angle is irradiated. And an exposure process including light of the 334 nanometers band is performed. The pretilt was formed by light of the 334 nanometers band. Photo-alignment efficiency of the band of 334 nanometers (about 334 to about 340 nanometers) is reduced as compared with that of the band of 297 nanometers to 314 nanometers. But, since the band of 334 nanometers was included in the formation of pretilt and did not affect the image sticking, it is okay that the light is included in the exposure process. As a result, the wavelength band of 340 nanometers or less may be used for the efficient energy irradiation.

2) Evaluation for Thickness Difference of the Texture Depending on Pretilt

The 3-th wavelength band and the 5e-th wavelength band were selected from the wavelength bands of the ultraviolet exposure apparatus to confirm the variation amount of the texture of the liquid crystal display. The photo-alignment process using the ultraviolet exposure apparatus was performed on the alignment material. The process conditions of the photo-alignment process were an exposure amount of 50 mJ, an exposure intensity of 40 mW/cm$^2$, and an irradiated angle of 45 degrees.

The substrate irradiated with light of the 3-th wavelength band was prepared. Light of the 5e-th wavelength band with 20 mJ was additionally irradiated to the substrate irradiated with light of the 3-th wavelength band.

Figure 10A:
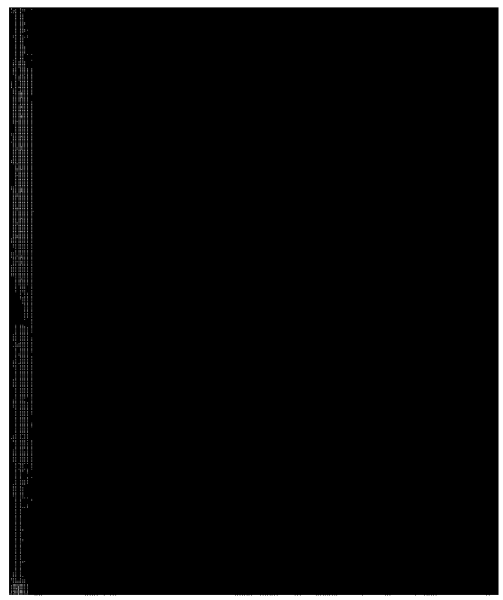
FIG. 10A is a photograph of a pixel irradiated with light of a 3-th wavelength band.
Figure 10B:
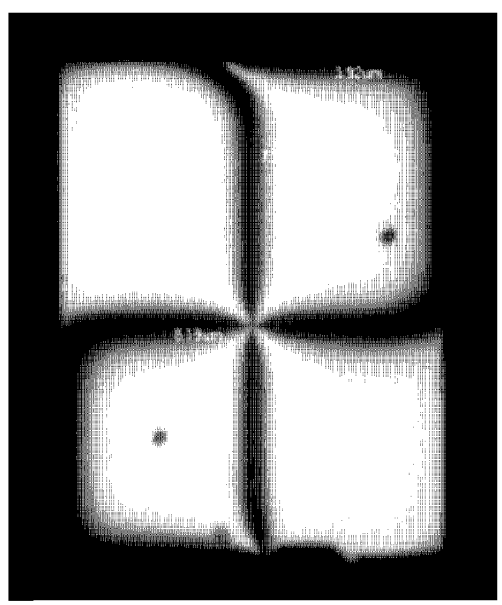
FIG. 10B is a photograph of a pixel irradiated with light of a 3-th wavelength band and additionally irradiated with light of a 5e-th wavelength band.

FIG. 10A is a photograph of a pixel irradiated with light of a 3-th wavelength band, and FIG. 10B is a photograph of a pixel irradiated with light of a 3-th wavelength band and additionally irradiated with light of a 5e-th wavelength band.

Referring to FIGS. 10A and 10B, in the substrate irradiated with light of the 3-th wavelength band, the pretilt angle of the alignment layer was 88.2 degrees and a thickness of the texture was about 7 μm. In the substrate irradiated with light of the 3-th wavelength band and additionally irradiated with light of the 5e-th wavelength band, the pretilt angle of the alignment layer was 88.5 degrees (less pretilt by 0.3 degrees), and the thickness of the texture was about 8 μm. Thus, it was confirmed that light of the 5e-th wavelength band increased the thickness of the texture. When the thickness of the texture is increased, the transmittance of the liquid crystal display is reduced.

Experiment Example 4

Evaluation for Upper Limit Range of Exposure Amount

1) Evaluation for Image Sticking

The 1b-th wavelength band was selected from the wavelength bands of the ultraviolet exposure apparatus to perform the evaluation for the image sticking of the liquid crystal display depending on the exposure amount. The photo-alignment process using the ultraviolet exposure apparatus was performed on the alignment material. The process conditions of the photo-alignment process were a wavelength band of 280 nanometers to 340 nanometers, an exposure intensity of 40 mW/cm$^2$, and an irradiated angle of 45 degrees.

The result of a linear image sticking when an exposure amount of 300 mJ was used was 168 hours. The linear image sticking when exposure amounts of 50 mJ and 3 mJ were used, did not occur after more than 1000 hours.

The results of the surface image sticking evaluated for 336 hours were a level 5 at the exposure amount of 300 mJ, a level 4 at the exposure amount of 100 mJ, a level 2 at the exposure amount of 50 mJ, and a level 1.5 at the exposure amount of 10 mJ.

The results of the black image sticking evaluated for 336 hours were a level 5 at the exposure amount of 300 mJ, a level 4 at the exposure amount of 100 mJ, a level 2 at the exposure amount of 50 mJ, and a level 1 at the exposure amount of 10 mJ.

As described above, the black image sticking, the surface image sticking, and the linear image sticking were deteriorated as the exposure amount increased.

2) Evaluation for VHR and ID According to the Increase of the Exposure Amount

The 1b-th wavelength band was selected from the wavelength bands of the ultraviolet exposure apparatus to perform the evaluation for the VHR and ID of the liquid crystal display depending on the exposure amount. The photo-alignment process using the ultraviolet exposure apparatus was performed on the alignment material. The process conditions of the photo-alignment process were a wavelength band of 280 nanometers to 340 nanometers, an exposure intensity of 40 mW/cm$^2$, and an irradiated angle of 45 degrees.

Figure 11:
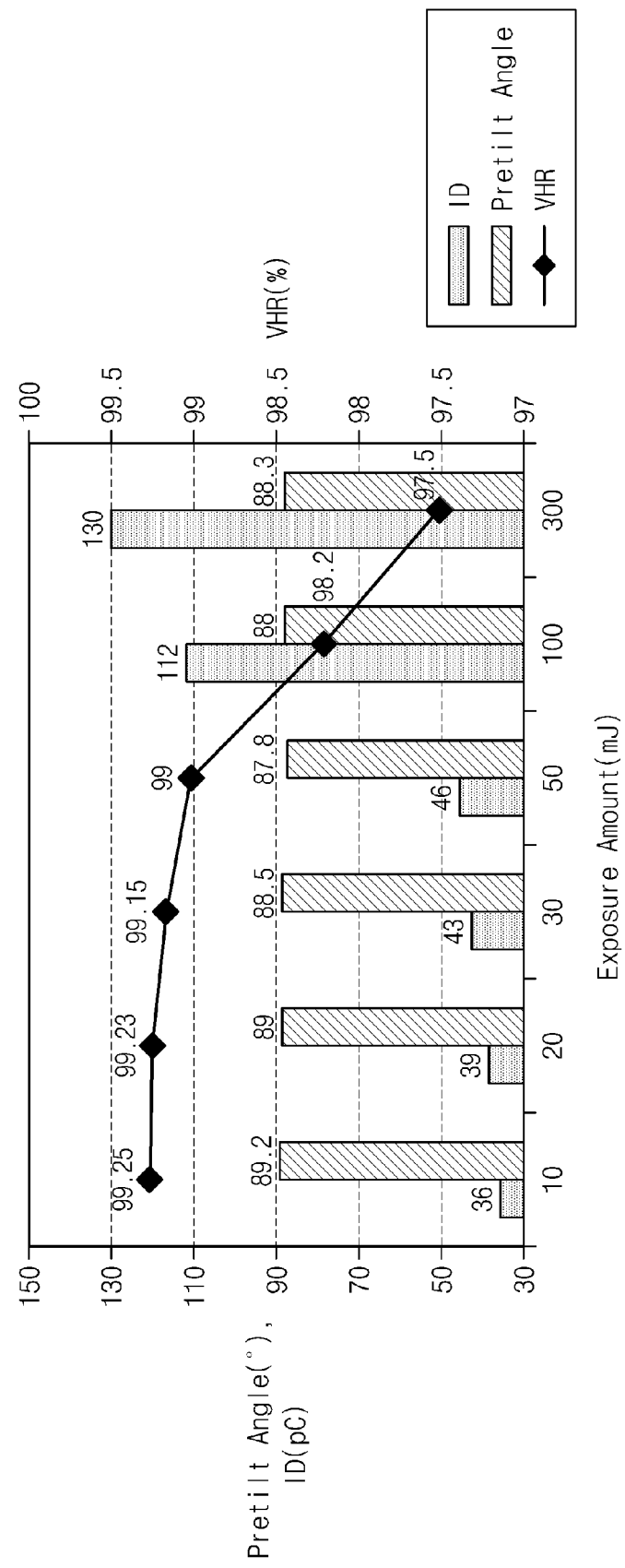
FIG. 11 is a graph showing a VHR, an ID, and a pretilt depending on an exposure amount.

FIG. 11 is a graph showing a VHR, an ID, and a pretilt depending on an exposure amount.

Referring to FIG. 11, it was confirmed that the characteristics of the VHR and ID were rapidly reduced when light was irradiated to the alignment layer with the exposure amount of 50 mJ or more. The reduction of the VHR, and the increase of the ID as much as 3 to 4 times were confirmed when light was irradiated with the exposure amount of 100 mJ. As a result, it was confirmed that the electrical characteristic of the liquid crystal display was deteriorated when the alignment layer was formed with the exposure amount of 50 mJ or more.

3) Evaluations for Transmittance, and Swingback of Pretilt Angle

The 1b-th wavelength band was selected from the wavelength bands of the ultraviolet exposure apparatus to perform the evaluation for the transmittance of the liquid crystal display depending on the exposure amount. The photo-alignment process using the ultraviolet exposure apparatus was performed on the alignment material. The process conditions of the photo-alignment process were a wavelength band of 280 nanometers to 340 nanometers, an exposure intensity of 40 mW/cm$^2$, and an irradiated angle of 45 degrees.

Figure 12:
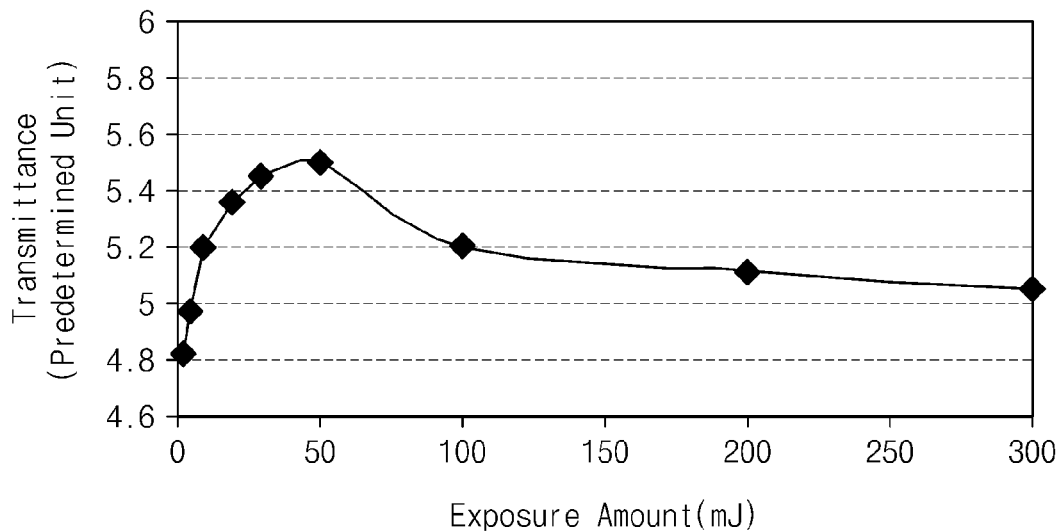
FIG. 12 is a graph showing the variation amount of a transmittance depending on an exposure amount.

FIG. 12 is a graph showing the variation amount of a transmittance depending on an exposure amount. Referring to FIG. 12, when light was irradiated to the alignment layer, the pretilt angle tended to be increased up to about 50 mJ and then reduced above about 50 mJ. If the pretilt angle is reduced, the texture is increased, so that the transmittance is reduced. Thus, the exposure amount should not exceed about 50 mJ so that the pretilt angle may not be reduced.

4) Evaluation for Variation Amount of Pretilt Angle

The 1b-th wavelength band was selected from the wavelength bands of the ultraviolet exposure apparatus to perform the evaluation for the variation amount of the pretilt angle of the liquid crystal display depending on the exposure amount. The photo-alignment process using the ultraviolet exposure apparatus was performed on the alignment material. The process conditions of the photo-alignment process were a wavelength band of 280 nanometers to 340 nanometers, an exposure intensity of 40 mW/cm$^2$, and an irradiated angle of 45 degrees.

Figure 13:
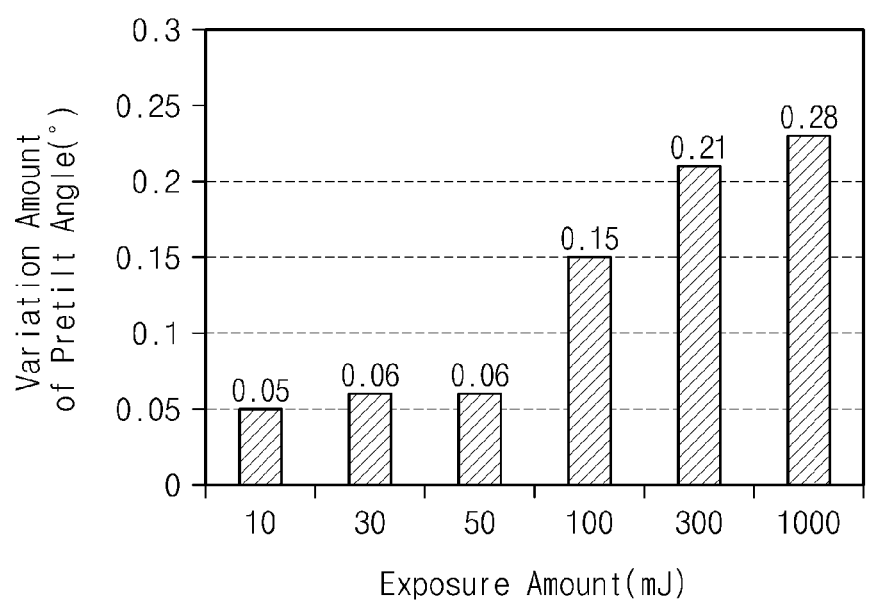
FIG. 13 is a graph showing the variation amount of a pretilt angle depending on an exposure amount.

FIG. 13 is a graph showing the variation amount of a pretilt angle depending on an exposure amount.

Referring to FIG. 13, it is confirmed that the variation amount of the pretilt angle is relatively small (0.1 degree or less) at the exposure amount of 50 mJ or less, and the variation amount of the pretilt angle is increased at the exposure amount of 100 mJ or more. This result may be due to thermal fluidity of perpendicular components by the side reaction or the surface variation according to the increase of the exposure amount. As a result, the black image sticking and the surface image sticking may be deteriorated.

5) Evaluation for Photo-Rearrangement

Referring to FIG. 7, the peak of —OH was greatly increased at the exposure amount of 250 mJ as compared with the exposure amount of 50 mJ. This result is also due to the photo-rearrangement.

Experiment Example 5

Evaluation for Lowest Limit Range of Exposure Amount of Ultraviolet

1) Evaluation for Occurrence Energy of Pretilt According to a Material.

The 1b-th wavelength band was selected from the wavelength bands of the ultraviolet exposure apparatus to perform the evaluation for the pretilt angle of the liquid crystal display depending on the exposure amount. The pretilt angles were measured using first, second, and third materials which were formed of the alignment material according to an exemplary embodiment of the present invention. However, the first to third materials had composition ratios partially different from each other. The process conditions of the photo-alignment process using the ultraviolet exposure apparatus were a wavelength band of 280 nanometers to 340 nanometers, an exposure intensity of 40 mW/cm$^2$, and an irradiated angle of 45 degrees with respect to the first to third materials.

Figure 14A:
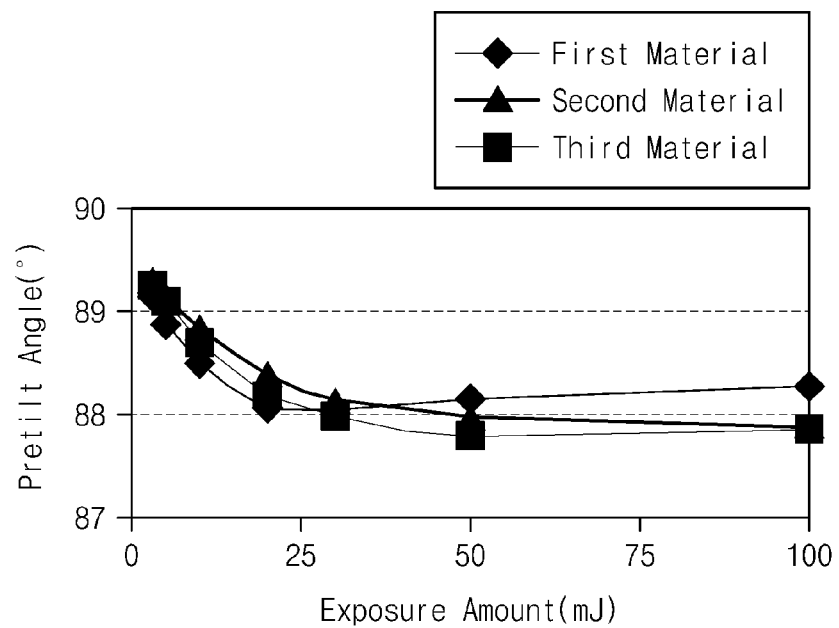
FIG. 14A is a graph showing a pretilt angle depending on an exposure amount.
Figure 14B:
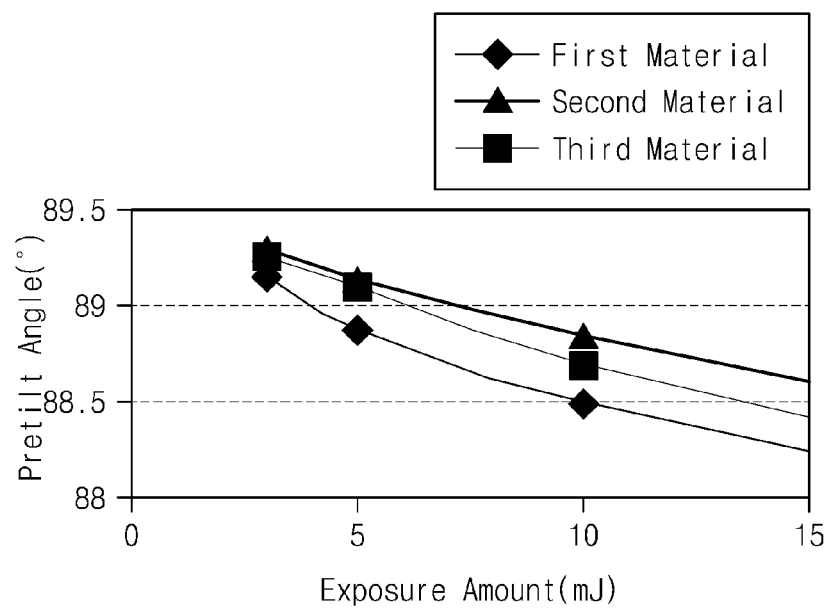
FIG. 14B is an enlarged view showing a portion of FIG. 14A.

FIG. 14A is a graph showing a pretilt angle depending on an exposure amount for each of the three materials, and FIG. 14B is an enlarged view showing a portion of FIG. 14A.

The pretilt angle of liquid crystal molecules may be 0.5 degrees or more from normal in a photo-alignment panel without an electrode pattern such as patterned vertical alignment (PVA) so that uniform directionality and control of the liquid crystal are secured. If the exposure amount is less than a predetermined value, differences between initial pretilt angles of the same material occur. Thus, a minimum exposure energy for the photo-alignment is about 3 mJ to about 5 mJ or more. Finally, the energy of about 3 mJ or more is required when the alignment and distribution of the first to third materials are contemplated. The pretilt angle with respect to the energy of about 3 mJ or more corresponds to a range of 0.7~0.9 degrees from normal.

2) Evaluation for Beating Texture

When the pretilt angle is 0.2~0.3 degrees from normal, the alignment is achieved, but other faults occur. The most general one of the faults is the beating texture fault. The beating texture fault refers to molecules of the liquid crystal in disorder to generate texture when an external impact is applied and although the external impact is eliminated, the liquid crystal molecules are not back to the original direction. The beating texture is intertwined with the pretilt angle. According to results of experiment, a minimum pretilt angle, which did not generate the beating texture, was 0.8 degrees from normal. The beating texture was markedly reduced at the exposure amount of about 3 mJ or more.

Experiment Example 6

Evaluation for Transmittance according to Exposure Amount

The 1b-th wavelength band was selected from the wavelength bands of the ultraviolet exposure apparatus to measure the transmittance and the pretilt angle of the liquid crystal display depending on the exposure amount. The pretilt angles were measured using the second material among the first to third materials which were formed of the alignment material according to an exemplary embodiment of the present invention but had composition ratios partially different from each other. The process conditions of the photo-alignment process using the ultraviolet exposure apparatus were a wavelength band of 280 nanometers to 340 nanometers, an exposure intensity of 40 mW/cm$^2$, and an irradiated angle of 45 degrees.

Figure 15:
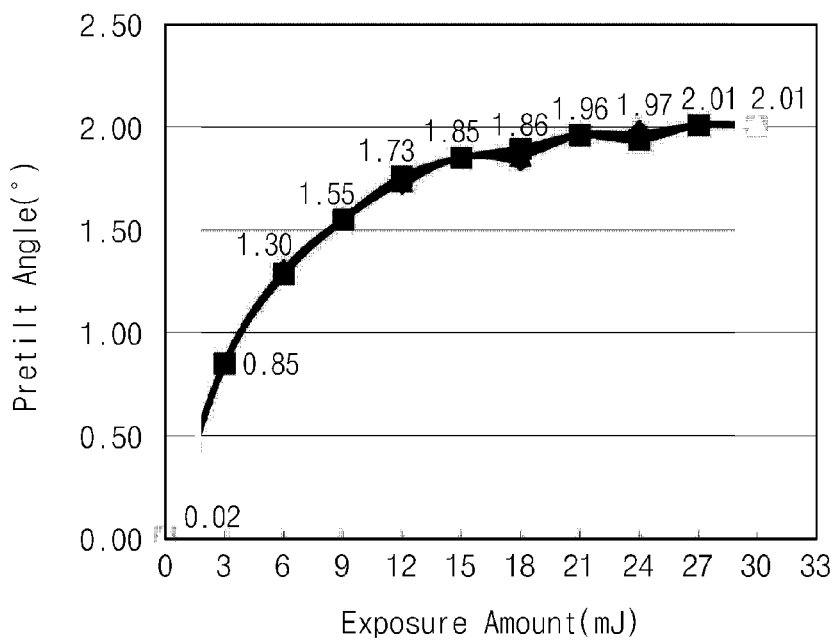
FIG. 15 is a graph showing a measurement value of a pretilt angle from normal depending on an exposure.
Figure 16:
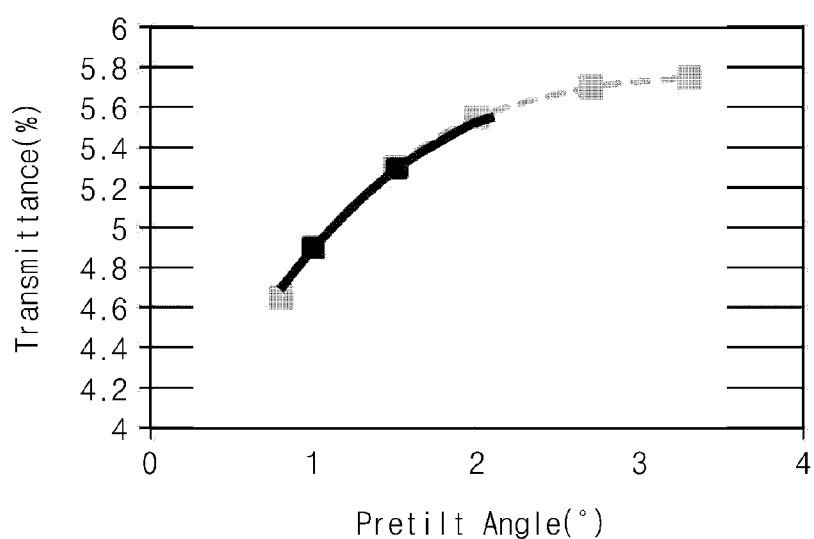
FIG. 16 is a graph showing a transmittance depending on a pretilt angle from normal.

FIG. 15 is a graph showing a measurement value of a pretilt angle (measured from normal) depending on an exposure, and FIG. 16 is a graph showing a transmittance depending on a pretilt angle (measured from normal). In FIG. 16, a solid line portion is a measured value, and a dotted line portion is an estimated value (extrapolation) based on the measured value.

Referring to FIG. 15, in the photo-alignment material, if the exposure amount is increased, the side reaction occurs to determine an upper limit value of the exposure amount, and if the exposure amount is reduced, the pretilt angle is reduced, so that the alignment is impossible and the transmittance is reduced.

Referring to FIG. 16, if the pretilt angle is increased, the transmittance is increased in a predetermined region.

Experiment Example 7

Evaluation for Pretilt Angle According to Irradiated Angle

The 1b-th wavelength band was selected from the wavelength bands of the ultraviolet exposure apparatus to measure the pretilt angle according to the irradiated angle. The process conditions of the photo-alignment process using the ultraviolet exposure apparatus were a wavelength band of 280 nanometers to 340 nanometers and an exposure intensity of 40 mW/cm² using the alignment material.

When the irradiated angles of the ultraviolet exposure apparatus were 20 degrees, 40 degrees, 50 degrees, and 60 degrees, from normal, the pretilt angles were 88.7 degrees, 88.2 degrees, 87.8 degrees, and 87.5 degrees, respectively. Here, a pretilt angle of 90 degrees refers to no pretilt angle and, for example, a pretilt angle of 88.7 degrees refers to a pretilt of 1.3 degrees from normal.

According to the above content, when light is irradiated with the same energy, the pretilt angle increased as the irradiated angle with respect to a direction perpendicular to the substrate (normal) increased. Thus, a greater pretilt angle is formed as the irradiated angle is increased. The image sticking is reduced by the reduction of the exposure amount, but an exposure region is reduced, so that an alignment time is increased and an alignment uniformity is deteriorated. As a result, the irradiated angle can have a range of about 30 degrees to about 60 degrees. In an embodiment of the present invention, the irradiated angle may have a range of about 40 degrees to about 50 degrees.

Experiment Example 8

Evaluation for Exposure Intensity

When light having the same energy is irradiated with the different exposure intensities within a range of 10 W/cm² to 50 mW/cm², significant differences of characteristics of the pretilt, the voltage holding ratio (VHR), the ion density (ID), and the image sticking may not be great. However, when the exposure intensity is lowered to about 10 mW/cm², the electrical characteristic is substantially the same as the electrical characteristic according to the exposure intensity higher than about 10 mW/cm², but the formation of the pretilt may be less. Also, if the exposure intensity is increased, the entire alignment time advantageously decreases, but a lifetime of the lamp providing the light and a photo-system are disadvantageously decreased.

Experiment Example 9

Conclusion of Evaluation for Exposure Process

The results according to the above experiment examples are expressed as the following table 1.

TABLE 1

| | Wavelength (nm) (Process conditions: Exposure amount of 50 mJ, Irradiated angle of 45 degrees, Exposure intensity of 40 mW/cm²) | | | | | | Exposure amount (mJ) (Process conditions: 3-th wavelength band, Irradiated angle of 45 degrees, Exposure intensity of 40 mW/cm²) | | | | Irradiated angle (degree) (Process conditions: 3-th wavelength band, Exposure amount of 50 mJ, Exposure intensity of 40 mW/cm²) | | | Exposure intensity (mW/cm²) (Process conditions: 3-th wavelength band, Irradiated angle of 45 degrees, Exposure amount of 50 mJ) | |
|---|---|---|---|---|---|---|---|---|---|---|---|---|---|---|---|
| | 4-th wavelength band | 1a-th wavelength band | 1b-th wavelength band | 5a-th to 5d-th wavelength band | 5e-th wavelength band | 3-th wavelength band | Less than 3 | Less than 50 | Less than 100 | Greater than 250 | 20 | 40 | 60 | 25 | 40 |
| Image sticking | X | ▽ | ○ | ○ | ○ | ○ | ◎ | ○ | ▽ | X | ○ | ○ | ○ | Same | |
| VHR, ID | X | ▽ | ○ | ○ | ○ | ○ | ◎ | ○ | ▽ | X | ○ | ○ | ○ | Same | |
| Pretilt angle | ○ | ○ | ○ | ○ | X | ◎ | X | ○ | ◇ | X | ▽ | ◇ | △ | Same | |
| Variation amount of pretilt angle | X | X | ○ | ○ | — | ○ | ○ | ○ | ▽ | X | ○ | ○ | ○ | Same | |
| Transmittance | ○ | ○ | ○ | ○ | ○ | ○ | ▽ | ◎ | ○ | ◇ | — | — | — | — | — |
| Process time | — | — | — | — | — | — | — | — | — | — | △ | ◇ | ▽ | ▽ | △ |
| Evaluation | — | — | — | — | — | Suitable | — | Suitable | — | — | — | Suitable | — | — | Suitable |

◎: Best, ○: Excellent, △: Good, ◇: Normal, ▽: Bad, X: Worst

As described above, when the alignment layer of the liquid crystal display is formed using the method according to an exemplary embodiment of the present invention, the alignment layer may be easily formed without an additional process such as a rubbing process. Also, the irradiated direction of light is easily changed to simplify forming a plurality of domains having alignment directions different from each other in a predetermined region of the alignment layer. Also, the image sticking, the ion density and the Vcom shift of the liquid crystal display are reduced, while the voltage holding ratio is not. Additionally, when the alignment layer of the liquid crystal display is formed using the method of forming the alignment layer according to an exemplary embodiment of the present invention, the desired pretilt angle is easily formed and the stability of the pretilt is improved. As a result, the beating texture fault of the liquid crystal display is reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of forming an alignment layer, comprising:
    disposing an alignment solution on a substrate comprising pixel regions;
    heating the alignment solution thereby forming an alignment layer; and irradiating a light having a wavelength of about 280 nanometers to about 340 nanometers on the alignment layer, thereby aligning the alignment layer, wherein the light is irradiated such that the alignment layer comprises domains in each pixel region, the domains in each pixel region being aligned in different directions from each other.

2. The method of claim 1, wherein the alignment layer comprises a photo reactive group, and the photo reactive group comprises a crosslinking reactive group which causes a photo dimerization or a photo isomerization with a reactive group adjacent thereto in response to the irradiated light.

3. The method of claim 2, wherein the photo reactive group comprises at least one of an azo compound, a cinnamate compound, a chalcone compound, a coumarin compound, and a maleimide compound.

4. The method of claim 2, wherein the light is irradiated with an exposure amount in a range of about 3 mJ to about 50 mJ.

5. The method of claim 2, wherein the light is irradiated with an angle in a range of about 40 degrees to about 50 degrees with respect to a normal line of the substrate.

6. The method of claim 2, wherein the light is linearly polarized light or partially polarized light.

7. The method of claim 2, wherein the light is irradiated with an intensity in a range of about 10 mW/cm$^2$ to about 50 mW/cm$^2$.

8. A method of fabricating a liquid crystal display, comprising:

forming a first alignment layer on a first substrate comprising pixel regions;

forming a second alignment layer on a second substrate; and disposing a liquid crystal layer between the first alignment layer and the second alignment layer, wherein at least one of forming the first alignment layer and forming the second alignment layer comprises:

disposing an alignment layer on a corresponding substrate; and irradiating a light having a wavelength of about 280 nanometers to about 340 nanometers on the alignment layer, thereby aligning the alignment layer, wherein the alignment layer comprises domains in each pixel region, the domains in each pixel region being aligned in different directions from each other.

9. The method of claim 8, wherein the irradiated alignment layer comprises a photo reactive group, and the photo reactive group comprises a crosslinking reactive group which causes a photo dimerization or a photo isomerization with a reactive group adjacent thereto in response to the irradiated light.

10. The method of claim 9, wherein the photo reactive group comprises at least one of an azo compound, a cinnamate compound, a chalcone compound, a coumarin compound, and a maleimide compound.

11. The method of claim 9, wherein the light is irradiated with an exposure amount in a range of about 3 mJ to about 50 mJ.

12. The method of claim 9, wherein the light is irradiated in a range of about 40 degrees to about 50 degrees with respect to a normal line of the corresponding substrate.

13. The method of claim 9, wherein the light is a linearly polarized light or a partially polarized light.

14. The method of claim 9, wherein the light is irradiated with an intensity in a range of about 10 mW/cm$^2$ to about 50 mW/cm$^2$.

15. The method of claim 9, wherein the liquid crystal layer comprises a vertical alignment mode liquid crystal layer.

* * * * *